(12) United States Patent
Cutler et al.

(10) Patent No.: US 6,770,392 B2
(45) Date of Patent: Aug. 3, 2004

(54) CERIA BASED SOLID ELECTROLYTES

(75) Inventors: Raymond Ashton Cutler, Bountiful, UT (US); Robin Edward Richards, Lansdale, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/843,519

(22) Filed: Apr. 27, 2001

(65) Prior Publication Data

US 2003/0027027 A1 Feb. 6, 2003

(51) Int. Cl.$^7$ ............................ H01M 8/12; C01F 17/00

(52) U.S. Cl. ........................................ 429/33; 252/62.2

(58) Field of Search ........................... 252/62.2; 429/30, 429/33

(56) References Cited

U.S. PATENT DOCUMENTS

| | | | | |
|---|---|---|---|---|
| 3,607,424 | A | 9/1971 | Makl et al. | 136/86 F |
| 4,465,778 | A | 8/1984 | Brook et al. | 501/104 |
| 5,508,242 | A | 4/1996 | Baumard et al. | 501/152 |
| 5,518,830 | A | 5/1996 | Worrell et al. | 429/31 |
| 5,750,279 | A | 5/1998 | Carolan et al. | 429/32 |
| 5,868,918 | A | 2/1999 | Adler et al. | 205/615 |
| 6,528,195 | B1 * | 3/2003 | Taniguchi | 429/33 |

FOREIGN PATENT DOCUMENTS

| | | | | |
|---|---|---|---|---|
| GB | 1322959 | 7/1973 | .......... | H01M/27/16 |
| JP | 5012566 | 5/1975 | ............ | H01M/8/12 |
| JP | H8169713 | 7/1996 | ............ | C01F/17/00 |
| WO | 9109430 | 6/1991 | ............ | H01M/8/12 |

OTHER PUBLICATIONS

CAPLUS abstract for Jurado, J.R., "Present Several Items on Ceria-based Ceramic Electrolytes: Synthesis, Additive Effects, Reactivity and Electrochemical Behavior", Journal of Materials Science (Mar. 1, 2001), 36(5), pp. 1133–1139.*
Horita, et al., "Oxygen Surface Exchange of $Y_{0.2}CE_{0.8}O_{2-x}$ Under Reducing Atmosphere", Electrochemical and Solid-State Letters, IEEE Service Center, Piscataway, NJ, US, vol. 1, No. 1, Jul. 1998, pp. 4–6.
Chen & Chen, "*Grain Growth in $CeO_2$: Dopant Effects, Defect Mechanism, and Solute Drag,*" (J. Am. Ceram. Soc. No. 79 (1996) p. 1793), No month available.
Baumard and coworkers, "*Sintered Ceria: A New Dense and Fine Grained Ceramic Material,*" (J. Less Com. Metals, 127, 125–130 (1987)), No month available.

* cited by examiner

Primary Examiner—Susy Tsang-Foster
(74) Attorney, Agent, or Firm—Keith D. Gourley

(57) ABSTRACT

The present invention relates to compositions of matter represented by the general formula $$Ln_xLn'_{x'}A_yTi_zCe_{1-x-x'-y-z}O_{2-\delta}$$

wherein Ln is selected from the group consisting of Sm, Gd, Y, Ln' is selected from the group consisting of La, Pr, Nd, Pm, Eu, Tb, Dy, Ho, Er, Tm, Yb, Lu;

A is selected from the group consisting of Mg, Ca, Sr and Ba, $0.05 \leq x \leq 0.25$, $0 \leq x' \leq 0.25$, $0 \leq y \leq 0.03$, $0.001 \leq z \leq 0.03$, $0.05 \leq x+x' \leq 0.25$, $0.001 \leq y+z \leq 0.03$, wherein $\delta$ is a number which renders the composition of matter charge neutral. The compositions can be formed into sintered bodies suitable for use as solid electrolytes in devices including solid-state oxygen generators.

Such sintered bodies have greater than 95% theoretical density at temperatures at or below 1600° C., and can be produced by a solid-state method.

6 Claims, No Drawings

CERIA BASED SOLID ELECTROLYTES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

Electrochemical devices comprising oxygen-ion conducting solid electrolytes have found considerable use in a variety of applications including processes for separating oxygen from oxygen-containing gases and sensors for measuring oxygen concentration in gaseous mixtures. Desirable properties for the solid electrolyte include low resistance to oxygen ion conduction and high strength. Such solid electrolytes are typically made as thin as possible to lower the power requirements for the electrochemical device, but thick enough to provide for sufficient mechanical stability to withstand pressure differences prevailing in the electrochemical device under operating conditions.

Ceria-based electrolytes are known to be useful in the above electrochemical devices. Ceria ($CeO_2$) electrolytes have oxygen vacancies which allow for oxygen ion conductivity. Ceria which possesses the fluorite structure exhibits rather low oxygen ionic conductivity under operating conditions. The concentration of oxygen vacancies within the solid electrolyte can be increased by adding a dopant having a different valence from $Ce^{4+}$ thereby increasing oxygen conductivity in the solid electrolyte. For example, Japanese laid-open publication H8-169713 teaches that ceria can be doped with alkaline earth metals such as Mg, Ca, Sr, Ba, or transition metals such as Zr, Hf, Nb, or Ta.

While a wide variety of dopants have been shown to be effective in increasing oxygen ionic conductivity in solid electrolytes, yttrium and lanthanides, especially Sm and Gd, and Mg, are considered to be preferred dopants to achieve high ionic conductivity in ceria based electrolytes. Chen & Chen (J. Am. Ceram. Soc. No. 79 (1996) p. 1793)) studied the effect of $Mg^{2+}$, $Ca^{2+}$, $Sr^{2+}$, $Sc^{3+}$, $Yb^{3+}$, $Y^{3+}$, $Gd^{3+}$, $La^{3+}$, $Ti^{4+}$, and $Nb^{3+}$ on the sintering behavior of undoped ceria. The researchers found that both titania and magnesia can "markedly enhance grain boundary mobility" which can lead to abnormal grain grown during sintering.

U.S. Pat. No. 3,607,424 discloses a solid electrolyte represented by the formula $(CeO_2)_2(Gd_2O_3)_x(MgO)_y$. Magnesia and gadolinia are each considered dopants which have been added in considerable amounts to increase oxygen ionic conductivity. Japanese laid-open publication JP 75-012566 discloses a ceria based solid electrolyte, wherein gadolinia and samaria are used as dopants for increasing oxygen ionic conductivity and magnesia is used as a sintering aid.

Japanese laid-open publication JP 62-28316 discloses a perovskite solid electrolyte represented by the formula $SrCe_{1-x-y}M_xM'_yO_3$ wherein M is Ti, Zr or Sn, M' is Y, Sc, Yb, Mg, Nd, Pr or Zn and both x and y are in the range of between 0 and 0.5. Dopants M and M' are added to increase oxygen ionic conductivity.

Solid electrolytes utilized in oxygen separation devices typically do not possess appreciable connected through porosity, meaning that such solid electrolytes do not contain a network of pores which are capable of transporting gases through the solid electrolyte. Solid electrolytes typically possess densities of above 95% of theoretical density in order to achieve no connected through porosity.

Doped ceria electrolytes formed from submicron powders typically require high compaction pressures (up to 1 GPa) and high sintering temperatures (around 1700° C.) to achieve densities of above 95% of theoretical density. These process conditions increase costs associated with producing such solid electrolytes.

Sintering aids have been used to reduce processing temperatures required to sinter solid electrolytes. Coprecipitation techniques utilizing metal hydroxides have been used to produce powders which readily sinter in the temperature range of 1400 to 1600° C., a desirable range in which to operating process equipment.

Japanese laid-open publication H8-159713 which teaches a coprecipitation method for making doped ceria which can be sintered at temperatures ranging from 1250 to 1600° C. while obtaining a density of above 95% of theoretical density. A coprecipitation method is also used in WO91/09430 which discloses sintering temperatures between 1300 and 1525° C. for a composition containing ceria and two dopants selected from rare earth metals and/or iron, cobalt, and nickel. Coprecipitated powders such as gadolinium doped ceria are commercially available.

Japanese laid-open publication JP 75-012566 discloses magnesia as a sintering aid in ceria doped with gadolinia and samaria. GB-1322959 discloses magnesia as a sintering aid and teaches sintering temperatures of between 1700 to 1850° C., which are beyond preferred temperatures ranges for commercial processes. U.S. Pat. No. 4,465,778 discloses magnesia as a sintering aid for pure zirconia, ceria, and thoria. Baumard and coworkers (J. Less Com. Metals, 127, 125–130 (1987)) showed that sintering can be enhanced by adding small amounts of niobia or titania (0.1 to 0.3 wt %).

The object of the present invention is to provide a ceria based composition of matter which can be formed into a desired shape (referred to as a green body) and sintered to greater than 95% theoretical density at temperatures at or below 1600° C. to form a solid electrolyte.

BRIEF SUMMARY OF THE INVENTION

These objects are solved and other deficiencies of the prior art are overcome by a composition of matter represented by the general formula:

$$Ln_xLn'_{x'}A_yTi_zCe_{1-x-x'-y-z}O_{2-\delta}$$

wherein Ln is selected from the group consisting of Sm, Gd, Y, Ln' is selected from the group consisting of La, Pr, Nd, Pm, Eu, Tb, Dy, Ho, Er, Tm, Yb and Lu; A is selected from the group consisting of Mg, Ca, Sr and Ba, and $0.05 \leq x \leq 0.25$, $0 \leq x' \leq 0.25$, $0 \leq y \leq 0.03$, $0.001 \leq z \leq 0.03$, $0.05 \leq x+x' \leq 0.25$ and $0.001 \leq y+z \leq 0.03$, and wherein δ is a number which renders the composition of matter charge neutral.

An alternate embodiment of the above mentioned composition of matter is defined by the general formula wherein Ln is Sm.

An alternate embodiment of the above mentioned composition of matter is defined by the general formula wherein A is Mg.

An alternate embodiment of the above mentioned composition of matter is defined by the general formula wherein $0.1 \leq x \leq 0.2$.

An alternate embodiment of the above mentioned composition of matter is defined by the general formula wherein y=0.

An alternate embodiment of the above mentioned composition of matter is defined by the general formula wherein x'=0.

Preferred compositions of matter are represented by the formula:

$$Ln_xTi_zCe_{1-x-z}O_{2-\delta}$$

wherein Ln is selected from the group consisting of Sm, Gd and Y
wherein $0.05 \leq x \leq 0.25$, $0.0025 \leq z \leq 0.02$ and wherein $\delta$ is a number which renders the composition of matter charge neutral.

An alternate embodiment of the preferred composition of matter is defined by the general formula wherein Ln is Sm.

An alternate embodiment of the preferred composition of matter is defined by the general formula wherein Ln is Gd.

An alternate embodiment of the preferred composition of matter is defined by the general formula wherein Ln is Y.

The invention also relates to a method of manufacturing a solid electrolyte comprising a composition of matter having a density greater than 95% theoretical density represented by the general formula $$Ln_xLn'_{x'}A_yTi_zCe_{1-x-x'-y-z}O_{2-\delta}$$

wherein Ln is selected from the group consisting of Sm, Gd, Y, and mixtures thereof; Ln' is selected from the group consisting of La, Pr, Nd, Pm, Eu, Tb, Dy, Ho, Er, Tm, Yb and Lu; A is selected from the group consisting of Mg, Ca, Sr and Ba, $0.05 \leq x \leq 0.25$, $0 \leq x' \leq 0.25$, $0 \leq y \leq 0.03$, $0.001 \leq z \leq 0.03$, $0.05 \leq x+x' \leq 0.25$, $0.001 \leq y+z \leq 0.03$, wherein $\delta$ is a number which renders the composition of matter charge neutral, said method comprising the steps of.

(a) forming a mixture by mixing metal-containing materials corresponding to the metals in the composition of matter to establish the stoichiometric coefficients of the metals of the composition of matter;

(b) forming the mixture into a desired shape for the solid electrolyte; and (c) sintering the desired shape at a temperature of less than or equal to 1600° C. to form the solid electroltye having a density greater than 95% theoretical density.

The metal-containing materials utilized in such method are preferably metallic oxides.

The average particle size of the metallic oxides utilized in the method have an average particle size of less than 5 µm.

The mixing according to the method is preferably effected by a technique selected from the group consisting of attrition milling, vibratory milling, ball milling and high shear mixing.

BRIEF DESCRIPTION OF SEVERAL VIEWS OF THE DRAWINGS

Not applicable.

DETAILED DESCRIPTION OF THE INVENTION

The present invention relates to a composition of matter represented by the general formula:

$$Ln_xLn'_{x'}A_yTi_zCe_{1-x-x'-y-z}O_{2-\delta}$$

wherein Ln is selected from the group consisting of Sm, Gd, Y, Ln' is selected from the group consisting of La, Pr, Nd, Pm, Eu, Tb, Dy, Ho, Er, Tm, Yb and Lu; A is selected from the group consisting of Mg, Ca, Sr and Ba, and $0.05 \leq x \leq 0.25$, $0 \leq x' \leq 0.25$, $0 \leq y \leq 0.03$, $0.001 \leq z \leq 0.03$, $0.05 \leq x+x' \leq 0.25$ and $0.001 \leq y+z \leq 0.03$, and wherein $\delta$ is a number which renders the composition of matter charge neutral.

An alternate embodiment of the above mentioned composition of matter is defined by the general formula wherein Ln is Sm.

An alternate embodiment of the above mentioned composition of matter is defined by the general formula wherein A is Mg.

An alternate embodiment of the above mentioned composition of matter is defined by the general formula wherein $0.1 \leq x \leq 0.2$.

An alternate embodiment of the above mentioned composition of matter is defined by the general formula wherein y=0.

An alternate embodiment of the above mentioned composition of matter is defined by the general formula wherein x'=0.

The compositions of matter according to the present invention necessarily contain a metal selected from the group consisting of Sm, Gd, and Y in combination with Ti and Ce.

The compositions of matter according to this invention show a surprisingly low sintering temperature equal to or below 1600° C., preferably in the range of about 1200° C. to below 1600° C., more preferably 1400° C. to less than 1600° C.

For use in an electrochemical device such as a device for separating oxygen from oxygen-containing gaseous mixtures, the compositions typically exhibit oxygen ion conductivities ranging from 0.01 S cm$^{-1}$ to 100 S cm$^{-1}$, and electronic conductivities of $\leq 10^{-2}$ S cm$^{-1}$.

Solid electrolytes formed from the compositions of matter according to this invention have no connected through porosity and typically have a density of greater than about 95% of theoretical density. Theoretical density is measured according to known techniques. Suitable techniques for measuring theoretical density include G. H. Stront, L. H. Jensen, in "X-ray Structure Determination, A Practical Guide", The Macmillan Company Collier-Mac millan, Ltd. London, p. 80–81.

Preferred compositions of matter are represented by the general formula:

$$Ln_xTi_zCe_{1-x-z}O_{2-\delta}$$

wherein Ln is selected from the group consisting of Sm, Gd and Y
wherein $0.05 \leq x \leq 0.25$, $0.0025 \leq z \leq 0.02$ and wherein $\delta$ is a number which renders the composition of matter charge neutral.

An alternate embodiment of the preferred composition of matter is defined by the general formula wherein Ln is Sm.

An alternate embodiment of the preferred composition of matter is defined by the general formula wherein Ln is Gd.

An alternate embodiment of the preferred composition of matter is defined by the general formula wherein Ln is Y.

The compositions of matter according to this invention may be formed into and used as a solid electrolyte in conventional electrochemical devices known in the art.

These solid electrolytes are typically in the form of a thin sintered body comprising the composition of matter.

Solid electrolytes for use in electrochemical devices are typically made as thin as possible to lower the power requirements of the device. Typically such thickness is in the range of below 500 μm, preferably ≦250 μm. Nevertheless, the solid electrolyte must be thick enough to provide sufficient mechanical stability to withstand any pressure differences prevailing in the device.

The solid electrolyte formed from the compositions of matter of the present invention may be fabricated into any suitable form known in the art. For example, the solid electrolyte may be in the form of a flat sheet, may have a honeycomb structure or may be of tubular shape. More preferably, the solid electrolyte may be in the form of a substantially square flat disc or plate, optionally having rounded edges, and having a central opening such as disclosed in U.S. Pat. Nos. 5,868,918, and 5,750,279, both assigned to Air Products and Chemicals Inc., the disclosures which are incorporated herein by reference. Any electrochemical device known in the art may benefit from the solid electrolytes of the present invention which are formed from the enumerated compositions of matter. Exemplary electrochemical devices are disclosed in U.S. Pat. Nos. 5,868,918 and 5,750,279.

The invention also relates to a method of manufacturing a solid electrolyte comprising a composition of matter having a density greater than 95% theoretical density represented by the general formula $$Ln_xLn'_{x'}A_yTi_zCe_{1-x-x'-y-z}O_{2-\delta}$$

wherein Ln is selected from the group consisting of Sm, Gd, Y, and mixtures thereof; Ln' is selected from the group consisting of La, Pr, Nd, Pm, Eu, Tb, Dy, Ho, Er, Tm, Yb and Lu; A is selected from the group consisting of Mg, Ca, Sr and Ba, $0.05 \leq x \leq 0.25$, $0 \leq x' \leq 0.25$, $0 \leq y \leq 0.03$, $0.001 \leq z \leq 0.03$, $0.05 \leq x+x' \leq 0.25$, $0.001 \leq y+z \leq 0.03$, wherein δ is a number which renders the composition of matter charge neutral, said method comprising the steps of.

(a) forming a mixture by mixing metal-containing materials corresponding to the metals in the composition of matter to establish the stoichiometric coefficients of the metals of the composition of matter;

(b) forming the mixture into a desired shape for the solid electrolyte; and (c) sintering the desired shape at a temperature of less than or equal to 1600° C. to form the solid electroltye having a density greater than 95% theoretical density.

The metal-containing materials utilized in such method are preferably metallic oxides.

According to step (a) of the method, the practitioner shall choose a desired composition of matter falling under the formulae presented in this specification to make a desired solid electrolyte, by identifying the metals and the amounts thereof to be incorporated into such composition. One of ordinary skill in the art can accomplish this step without undue experimentation. Metal-containing materials corresponding to the metals in the composition of matter to be made are thus mixed in the amounts corresponding to the stoichiometric coefficients of the composition to be made. The mixing according to the method is preferably effected by a technique selected from the group consisting of attrition milling, vibratory milling, ball milling and high shear mixing.

The average particle size of the metal-containing materials are desirably less than 10 μm and provide surface areas of greater than 1 m²/g. Average particle sizes of less than 5 μm and surface areas greater than 2 m²/g are more desirable and in a preferred embodiment the average particle size is less than 2.5 μm and the surface area is greater than 4 m²/g.

Suitable mixing can be effected in step (a) by conventional means including attrition milling, vibratory milling, ball milling and high sheer mixing. For example, if tape casting, slip casting, uniaxial pressing, or isostatic pressing are the preferred choices for fabrication of the solid electrolyte, then ball milling, vibratory milling or attrition milling would be preferable to high sheer mixing; whereas, if roll compaction, extrusion or injection molding were the preferred method then high sheer mixing would be most desirable. An important principle is that diffusion distances are minimized by decreasing particle size and making a homogenous mixture. Conventional binders, plasticizers and solvents may also be utilized as is conventional in the art.

The second step of the method requires establishing a desired shape of the solid electrolyte to be fabricated and forming the mixture of the previous step into such desired shape. Such shapes can be chosen from those known in the art. Techiques for forming such shapes are well known in the art.

The third step of the method requires sintering the mixture in the desired shape to provide the solid electrolyte. Sintering can occur in electric, gas, microwave, plasma, or other furnaces. Batch or continuous furnaces can effectively be used. Sintering temperatures should typically be at or below about 1600° C., preferably in the range of about 1400 to less than 1600° C. Sintering temperatures are, however, in general above 1200° C. Sintering time refers to the time that the object to be sintered is held at the maximum temperatures of the sintering temperature profile. Such sintering times are typically in the range of about 0.5 h to about 10 h, preferably about 1 h to about 5 h. The preferred combination of sintering temperature and sintering time can be obtained without undue experimentation. Sintering in air is most economical, but other atmospheres may also be suitable as known in the art.

The invention will further be explained by way of reference to the following examples which are given for illustration purposes only and are not intended to limit the scope of this invention.

EXAMPLE 1

$$Ce_{0.895}Sm_{0.100}Ti_{0.005}O_{2-\delta}$$

538.9 grams CeO₂ (Rhone Poulenc ceramic grade), 60.9 grams Sm₂O₃, (Molycorp grade 5810), and 1.38 grams TiO₂ (Degussa grade P25) were added to 3.0 grams dispersant (Witco PS-21A), 168 grams toluene and 42 grams ethanol in a one liter polyethylene jar with 1.5 kg high purity ZrO₂ (3 mol. % Y₂O₃) spherical media. The slurry was mixed for 24 hours at 115 rpm and 210 grams of predissolved binder/plasticizer (32.8 wt. % polyvinyl butyral binder (Monsanto grade B-79), 13.1 wt. % butyl benzyl phthalate plasticizer (Monsanto grade S-160), 43.3 wt. % toluene, and 10.8 wt. % ethanol) was added and the slurry was mixed for additional 2 h.

The slurry was degassed and cast at a doctor blade height of 1.15 mm, resulting in a green tape upon drying having a thickness of ≈300 μm. The green tape was sintered to form the solid electrolyte by heating 20–200° C. in 6 h, 200–450° C. in 10 h, 450–1500° C. in 1 h, 2 h hold at 1500° C., and cooling 1500–20° C. in 15 h. The density of the solid electrolyte was 7.13 g/cc. The solid electrolytes were 250 μm thick.

EXAMPLE 2 Comparative $Ce_{0.895}Sm_{0.100}Mg_{0.005}O_{2-\delta}$ 538.9 grams $CeO_2$ (Rhone Poulenc ceramic grade), 60.9 grams $Sm_2O_3$, (Molycorp grade 5810), and 0.72 grams MgO (Baker Chromatographic grade) were added to 3.0 grams dispersant (Witco PS-21A), 168 grams toluene and 42 grams ethanol in a one liter polyethylene jar with 1.5 kg high purity $ZrO_2$ (3 mol. % $Y_2O_3$) spherical media. The slurry was mixed for 24 h at 115 rpm and 210 grams of predissolved binder/plasticizer (32.8 wt. % polyvinyl butyral binder (Monsanto grade B-79), 13.1 wt. % butyl benzyl phthalate plasticizer (Monsanto grade S-160), 43.3 wt. % toluene, and 10.8 wt. % ethanol) was added and the slurry was mixed for additional 2 h.

The slurry was degassed and cast at a doctor blade height of 1.15 mm, resulting in a green tape upon drying having a thickness of ≈300 μm. The green tape was sintered as in Example 1 to form the solid electrolyte. The density of the solid electrolyte was only 6.42 g/cc. Firing at 1550° C. increased the density to 6.74 g/cc. This example shows that magnesia provides higher density than titania under similar process conditions.

EXAMPLES 3–5

The compositions of Table 1 were produced. The sources for $CeO_2$, $Sm_2O_3$, and $TiO_2$ were the same as in Example 1. The $Gd_2O_3$ (Molycorp grade 5780) and $Y_2O_3$ (Molycorp grade 5600) powders were nominally 99.99% pure, while the $Sm_2O_3$ was greater than 99.6% pure. The samples were processed and sintered as in Example 1. The sintered densities are given in Table 1. All densities were greater than 99% of theoretical. The Table demonstrates that the referenced compositions of matter containing gadolinia, ytrria and samaria provide solid electrolytes having similar density as a percentage of theoretical density.

TABLE 1

| Example | Nominal Composition | Weight of Reactants (grams) | | | | | Density of Sintered Body |
|---|---|---|---|---|---|---|---|
| | | $CeO_2$ | $Sm_2O_3$ | $Gd_2O_3$ | $Y_2O_3$ | $TiO_2$ | (g/cc) |
| 3 | $Ce_{0.795}Sm_{0.2}Ti_{0.005}O_{2-\delta}$ | 477.18 | 121.44 | 0.0 | 0.0 | 1.39 | 7.09 |
| 4 | $Ce_{0.795}Gd_{0.2}Ti_{0.005}O_{2-\delta}$ | 477.18 | 0.0 | 126.24 | 0.0 | 1.39 | 7.24 |
| 5 | $Ce_{0.795}Y_{0.2}Ti_{0.005}O_{2-\delta}$ | 477.18 | 0.0 | 0.0 | 78.64 | 1.39 | 6.68 |

EXAMPLES 6–11

654.5 grams $CeO_2$ (Rhone Poulenc ceramic grade) and 117.7 grams $SM_2O_3$ (Molycorp grade 5810 vibratory milled) were added to 1.93 grams dispersant (ICI PS2), 168 grams toluene and 42 grams ethanol in a one liter polyethylene jar with 1.5 kg high purity $ZrO_2$ (3 mol. % $Y_2O_3$) spherical media. 0.90 grams $TiO_2$ (Degussa grade P25) was added to Examples 6–8. Example 6 also contained 0.45 grams MgO (Baker Chromatographic grade), Example 7 had 1.13 grams $CaCO_3$ (Baker grade 1294–5) substituted for the MgO, and Example 8 used 1.66 grams $SrCO_3$ (Solvay grade SL 300) as the source of the Group 2 metal.

The slurries were mixed for 16 h at 115 rpm and 69.23 grams polyvinyl butyral binder (Monsanto grade B-79), 29.76 butyl benzyl phthalate plasticizer (Monsanto grade S-160), 74.0 grams toluene, and 18.5 grams ethanol were added and the slurries were mixed for additional 6 h. The slurries were degassed and cast at a doctor blade height of 1.15 mm, resulting in a green tape upon drying having a thickness of ≈300 μm.

Examples 6–11 were sintered at the specified temperature (1500 and 1550° C.) for 2 h to form the solid electrolyte. Results are shown in Table 2 which demonstrate that the referenced compositions of matter containing magnesia provides a higher density as a percentage of theoretical density compared to the referenced compositions of matter containing strontia or calcia.

TABLE 2

| | | Density of Sintered Body (g/cc) | |
|---|---|---|---|
| Example | Nominal Composition | 1500° C. | 1550° C. |
| 6 | $Ce_{0.845}Sm_{0.15}Ti_{0.0025}Mg_{0.0025}O_{2-\delta}$ | 7.08 | 7.26 |
| 7 | $Ce_{0.845}Sm_{0.15}Ti_{0.0025}Ca_{0.0025}O_{2-\delta}$ | 6.89 | 7.11 |
| 8 | $Ce_{0.845}Sm_{0.15}Ti_{0.0025}Sr_{0.0025}O_{2-\delta}$ | 6.84 | 7.11 |
| 9 | $Ce_{0.84}Sm_{0.15}Ti_{0.00325}Mg_{0.00675}O_{2-\delta}$ | 6.8 | |
| 10 | $Ce_{0.84}Sm_{0.15}Ti_{0.005}Mg_{0.005}O_{2-\delta}$ | 7.04 | |
| 11 | $Ce_{0.84}Sm_{0.15}Ti_{0.0065}Mg_{0.0035}O_{2-\delta}$ | 7.13 | |

The present invention has been set forth with regard to several preferred embodiments, however, the full scope of the present invention should be ascertained from the claims which follow.

We claim:

1. A composition of matter represented by the general formula $$Ln_xLn'_{x'}A_yTi_zCe_{1-x-x'-y-z}O_{2-\delta}$$

wherein Ln is selected from the group consisting of Sm; Ln' is selected from the group consisting of La, Pr, Nd, Pm, Eu, Tb, Dy, Ho, Er, Tm, Yb and Lu; A is selected from the group consisting of Mg, Ca, Sr and Ba, $0.05 \leq x \leq 0.25$, $0 \leq x' \leq 0.25$, $0 \leq y \leq 0.03$, $0.001 \leq z \leq 0.03$, $0.05 \leq x+x' \leq 0.25$, $0.001 \leq y+z \leq 0.03$, wherein δ is a number which renders the composition of matter charge neutral.

2. The composition of matter of claim 1 wherein x'=0.

3. The composition of matter of claim 1 wherein A is Mg.

4. The composition of matter of claim 1 wherein $0.1 \leq x \leq 0.2$.

5. The composition of matter of claim 1 wherein y=0.

6. A composition of matter represented by the general formula $Ln_xTi_zCe_{1-x-z}O_{2-\delta}$ wherein Ln is selected from the group consisting of $Sm 0.05 \leq x \leq 0.25$, $0.0025 \leq z \leq 0.02$ and δ is a number which renders the composition of matter charge neutral.

* * * * *